Feb. 17, 1959 M. H. DIEHL 2,874,217

PULSE DETECTION METHOD AND APPARATUS

Filed Feb. 14, 1955 2 Sheets-Sheet 1

INVENTOR:
MAX H. DIEHL,

BY Julius J. Zaskalicky
HIS ATTORNEY.

Feb. 17, 1959 M. H. DIEHL 2,874,217

PULSE DETECTION METHOD AND APPARATUS

Filed Feb. 14, 1955 2 Sheets-Sheet 2

INVENTOR:
MAX H. DIEHL,

BY Julius J. Zaskalicky
HIS ATTORNEY.

2,874,217
Patented Feb. 17, 1959

2,874,217

PULSE DETECTION METHOD AND APPARATUS

Max H. Diehl, Syracuse, N. Y., assignor to General Electric Company, a corporation of New York Application February 14, 1955, Serial No. 487,771

5 Claims. (Cl. 178—69.5)

This invention relates in general to a pulse detection method and apparatus and in particular, to pulse detection apparatus for use in television systems.

In present standard color television systems, an oscillation wave of stable phase at the subcarrier frequency of the system is employed at the receiver in demodulating the color information contained in the sidebands of the subcarrier. Since the subcarrier is not transmitted, this wave must be locally generated at the receiver. To lock the local subcarrier oscillation generator at the proper frequency, pulses of synchronizing signals commonly called "color bursts" are transmitted following each horizontal synchronizing pulse. Present standards specify that the color bursts are not to be transmitted after equalizing or vertical synchronizing pulses.

Accordingly, a particular object of the present invention is to provide improved method and means for inserting color bursts in a color synchronizing signal only after the horizontal synchronizing pulses thereof.

Another object of the present invention is to provide new and improved circuit means for maintaining a burst frequency oscillation generator operative during the interval of transmission of horizontal synchronizing pulses and inoperative during the time interval when equalizing and vertical synchronizing pulses are transmitted.

A still other object of this invention is to provide new and improved method and means to distinguish pulses of intermediate duration from pulses of longer and shorter duration with respect thereto.

A further object of this invention is to provide new and improved circuit means for gating a burst frequency oscillation generator only after each horizontal synchronizing pulse.

In one embodiment of the present invention, there is provided means for differentiating the pulses of a train of pulses including short, intermediate, and long duration pulses to derive very short pulses corresponding to the lagging edges of the pulses of the train. Means are also provided for delaying each of the pulses of the train by an interval greater than the duration of the short pulses but less than the duration of the intermediate pulses. Additional means are provided for delaying each of the pulses of the train of pulses by another interval greater than the duration of each of the intermediate pulses and less than the duration of the long pulses. Further means are provided for inverting the phase of one of the trains of delayed pulses and combining the inverted train with the other train of delayed pulses to derive a resultant train of pulses. Still further means are provided for combining the resultant train of pulses with the differentiated train of pulses to derive a train of pulses, each pulse of which occurs only during the coincidence of pulses of the differentiated train with pulses of one polarity of the resultant train thereby detecting the lagging edges of each of the intermediate pulses in the one train of pulses. The derived train of pulses are utilized to insert the "color bursts" only after pulses of intermediate duration.

The features of this invention desired to be protected are pointed out in the appended claims. The invention itself, however, both as to its organization and method of operation together with further objects and advantages thereof may best be understood by reference to the following description taken in connection with the accompanying drawings in which:

Figure 1:
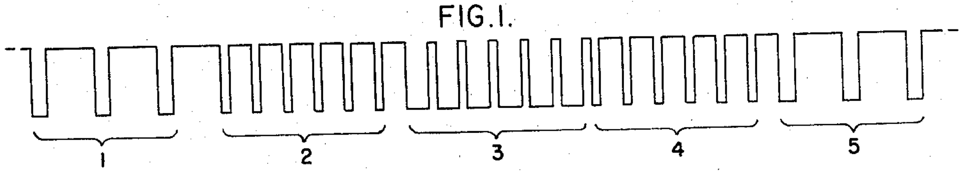
Fig. 1 is a graph of a standard television synchronizing signal useful in explaining the operation of an embodiment of my invention.

Referring now to Fig. 1, there is shown a graph of a synchronizing signal showing a plurality of horizontal synchronizing pulses 1, followed by six equalizing pulses 2, followed by six vertical synchronizing pulses 3, followed by six more equalizing pulses 4, followed by a plurality of horizontal synchronizing pulses 5. According to present day standards, the horizontal synchronizing pulses are intermediate in duration to the short equalizing pulses and long vertical synchronizing pulses.

Figure 2:
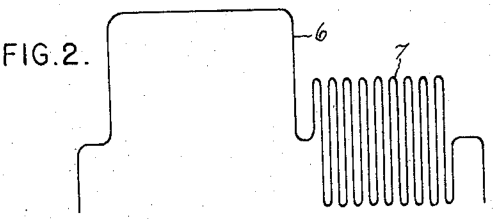
Fig. 2 shows another graph of a portion of a standard color television synchronizing signal useful in explaining the operation of an embodiment of the present invention.

In Fig. 2 there is shown a graph of a wave comprising a single horizontal synchronizing pulse being followed by a color burst signal 7 which comprises a nine cycle wave having the frequency of the color subcarrier and which is positioned at the approximate center of the back porch or rear portion of the pedestal on which the horizontal synchronizing pulse is situated. Present day standards require that the color burst signal 7 start at a predetermined time after the trailing edge of the horizontal synchronizing pulse 6. It will be understood that a similar waveform is generated and transmitted for each horizontal synchronizing pulse.

Figure 3:
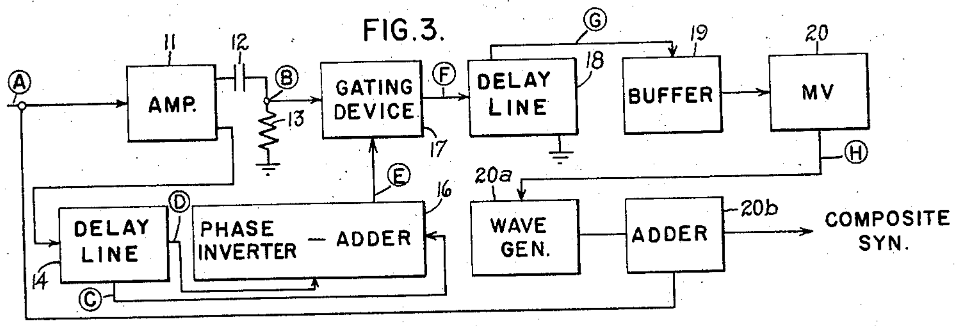
Fig. 3 shows a block diagram of apparatus embodying the present invention.
Figure 4:
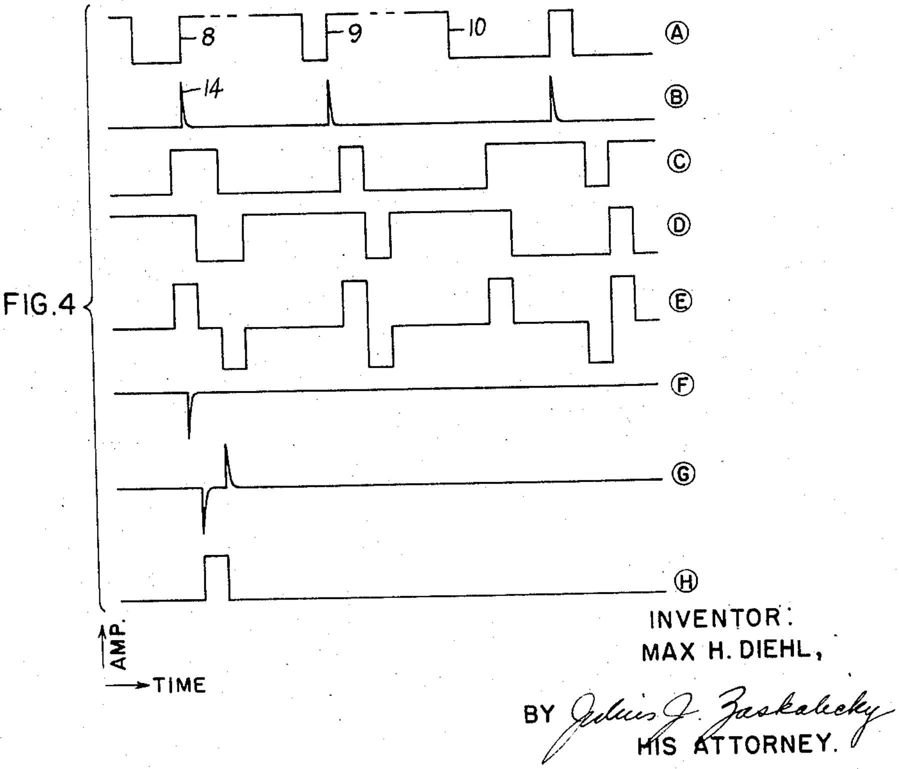
Fig. 4 shows a group of graphs of the waveform of signal existing at various points in the apparatus of Fig. 3 for facilitating an understanding of the embodiment of this figure.

Reference is now made to Fig. 3, wherein there is shown a block diagram of an illustrative embodiment of the present invention, and to Fig. 4, wherein are shown a plurality of graphs of amplitude versus time of the waveform of the signal appearing at those points in the block diagram of Fig. 3 which have the same literal designations as the graphs of Fig. 4. The polarities of the signals in Fig. 4 are chosen to simplify the explanation. Graph A represents a portion of the standard synchronizing signal including a horizontal synchronizing pulse 8, an equalizing pulse 9, and a vertical synchronizing pulse 10. Only three pulses have been shown in order to simplify the explanation of the operation of the invention. These pulses are applied at A in Fig. 3 to the amplifier 11. At the output of amplifier 11 is connected a differentiating capacitance 12 in series with a resistance 13. Thus, across the resistance 13 is obtained a differentiated wave, the pulses thereof corresponding to the lagging edge of the pulses of graph A only being shown for the reason that the gating device 17 is so arranged as to substantially clip or delete the negative pulses corresponding to the leading edge of the pulses of graph A. The output of amplifier 11 is also applied to a delay line 14 at point A of which is obtained a graph which is the inverse in polarity of the graph C and which is identical to the graph A except that each of the pulses thereof have been delayed by an interval greater than the duration of the equalizing pulse 9 but less than the duration of the horizontal synchronizing pulse 8. Similarly, at the other output (point D) of the delay line 14 is obtained another train of delayed pulses as shown in graph D similar to the pulses of graph A in which each of the pulses thereof are delayed by an interval less than the interval of the vertical synchronizing pulse 10 but greater than the interval of the horizontal synchronizing pulse. For purposes of convenience, the pulses at point D are shown in graph D inverse in polarity since they are immediately inverted by the phase-inverter associated with the adder-inverter device 16. The output from the point C of the delay line 14 and the output from point D of the delay line 14 are applied to the adder-inverter device 16 at the output E of which is obtained a signal having the form of graph E. It should be noted that because of the delay introduced into each of the pulses of graph C and those introduced into the pulses of graph D, only the pulses 14 (graph B) coinciding with the lagging edge of the horizontal synchronizing pulse coincide with the positive portions of the graph E. The gating device 17 develops an output only when the pulses applied thereto are of the same polarity and positive. Accordingly, application of a signal of the form of graph E to one input terminal of a gating device 17 and application of the signal appearing at B to the other input terminal of gating device 17 develops at the output thereof a signal of the form shown in graph F.

Since the color burst signal 7 of Fig. 2 occurs at a predetermined time interval after the lagging edge of horizontal pulse 6, the pulse of graph F is delayed by this interval in the delay line 18. In addition, from the delay line 18 is obtained a pulse occurring subsequent to the delayed pulse by an interval representing the desired duration of the color burst signal. The output of delay line 18 is shown in graph G.

The delay line 18 includes a pair of ends one of which is the input portion and the other end of which is short circuited. Intermediate the short circuit and the input end is tapped an output portion. Accordingly, on the forward travel of the pulse of graph F an output appears at the tap. Also, subsequent in time thereto appears the pulse which travels on to the shorted end of the line and is reflected back to the output portion. The delay of the negative pulse of graph G with respect to the negative pulse of graph F is the delay introduced in the pulse of graph F in traveling from the input portion of the delay line 18 to the output portion thereof. The interval between the pulses of graph G represents the time of travel of a pulse from the output of the delay line to the short circuited end and back to the output of the delay line. The output from the delay line 18 is applied through buffer 19 to a pulse generator 20. The buffer 19 serves to isolate the output from the delay line 18 from the input of the multivibrator 20. Multivibrator 20 may be any of a variety of devices in which conduction in one portion thereof is altered by the application of a pulse of one polarity and in which the original state of conduction is returned upon the application of a pulse of the opposite polarity. Accordingly, at the output of the multivibrator 20 is obtained a signal of the form shown in graph H. The output from the multivibrator 20 is applied to a burst gate generator 20*a* which develops waves during the occurrence of the pulses from the multivibrator 20. The wave generator 20*a* may include any of the variety of oscillators capable of being keyed to develop pulses of waves of the desired frequency. The output from the burst gate generator 20*a* is additively combined with the synchronizing signal of graph A in the adder device 20*b* at the output of which is obtained the composite synchronizing signal which is transmitted for synchronization of color television receivers.

Figure 5:
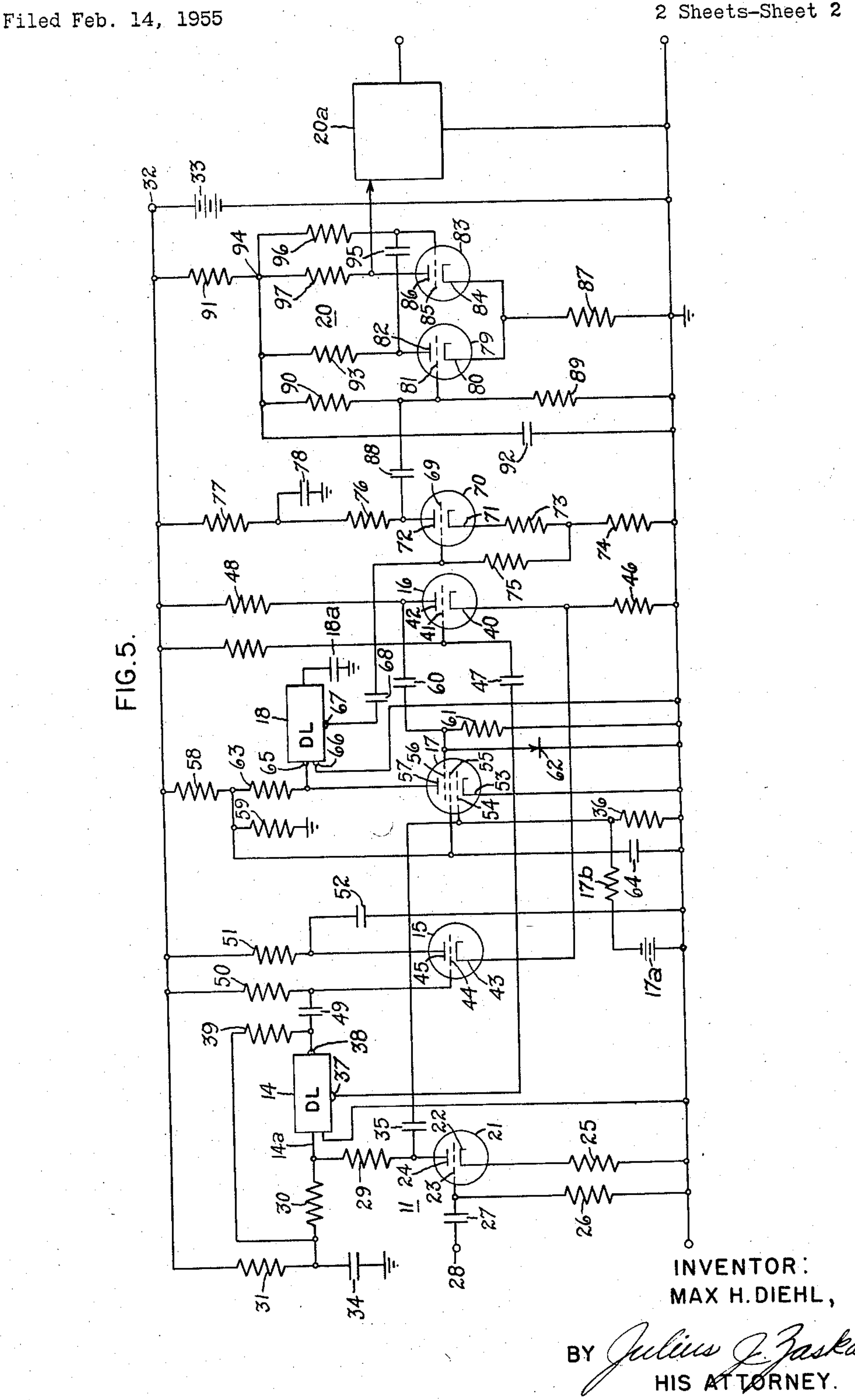
Fig. 5 shows a schematic diagram of a preferred embodiment of the present invention.

Referring now to Fig. 5, there is shown a schematic diagram of the embodiment of the drawing shown in block form in Fig. 3. Amplifier 11 comprises an electron discharge device 21 including a cathode 22, a grid 23, and an anode 24. The cathode 22 is connected through cathode load resistance 25 to ground. The grid 23 is connected through grid leak resistance 26 to ground and also through coupling capacitance 27 to input terminal 28 between which and ground is applied the synchronizing signal of graph A in inverted form. The anode 24 is connected through anode load resistances 29, 30, and 31 to the positive terminal 32 of source 33, the negative terminal of which is connected to ground. Between the junctions of resistances 30 and 31 and ground is connected a decoupling capacitance 34. Resistance 30 is in effect the source impedance for the delay line 14. A differentiating network including a capacitance 35, a resistance 36, is connected in series between the anode 24 and ground. Accordingly, across the resistance 36 is obtained a wave which represents the derivative of the wave applied to the input of amplifier 11. Only the positive pulses of the differentiated wave appear across resistance 36 as shown in graph B since the grid 54 of the electron discharge device 17 is biased negative with respect to cathode 53 by source 17*a* connected between ground and grid 54 through isolating resistance 17*b* and consequently, is responsive only to positive pulses applied to grid 54.

The output of the amplifier 11 appearing between the junctions of resistances 30 and 29 and ground is applied to the delay line 14 comprising input terminal 14*a* and output terminals 37 and 38. Terminating resistance 39 is connected between the output terminal 38 and the junction of resistances 30 and 31 and functions to properly load or terminate delay line 14. The delay line 14 may be any of a variety of delay lines including lumped or distributed elements and arranged in the form of a transmission line to introduce a desired delay into signals applied thereto. The delay between terminals 14*a* and output terminal 37 is arranged to be greater than the duration of the pulses of short duration (equalizing pulses) but less than the duration of the pulses of intermediate duration (horizontal synchronization pulses). Thus, when the wave of graph A (inverted) is applied to the input terminal 14*a* of delay line 14, at the output terminal 37 is obtained a signal of the form shown in graph C except reversed in polarity. The delay between the input terminal 14*a* and the output terminal 38 is arranged to be greater than the duration of the pulses of intermediate duration (horizontal synchronization pulses) and less than the duration of the pulses of long duration (vertical synchronization pulses). Accordingly, at the output terminal 38 is obtained a signal having a waveform of the kind shown in graph D.

The output between terminal 37 and ground is applied to adder-inverter device 16 comprising a cathode 40, a grid 41, and an anode 42. The output appearing between output terminals 38 and ground is applied through cathode follower impedance isolation stage 15 including cathode 43, grid 44, and anode 45 to the adder-inverter device 16. The cathodes 40 and 43 are connected through cathode resistance 46 to ground. The grid 41 is connected through coupling capacitance 47 to point 37. The anode 42 is connected through anode resistance 48 to the positive terminal 32. The grid 44 is connected through coupling capacitance 49 to terminal 38 and also through biasing resistance 50 to the positive terminal 32. The anode 45 is connected through anode resistance 51 to the positive terminal 32. The anode 45 is also connected through capacitance 52 to ground. Accordingly, with signals of the form shown in graphs C (inverted) and D applied to adder-inverter device 16, it is apparent that at the anode 42 will be obtained a train of pulses of the form shown in graph E which represents the sum of graph C (inverted) and graph D.

The output appearing between anode 42 and ground is applied to gating device 17 comprising a cathode 53, a grid 54, a screen grid 55, a suppressor grid 56 and an anode 57. The cathode 53 is connected to ground. The grid 54 is connected through differentiating resistance 36 to ground and also through differentiating capacitance 35 to anode 24. Screen grid 55 is connected through decoupling resistance 58 to the positive terminal 32 and also through voltage dividing resistance 59 to ground. The screen grid 55 is also bypassed to ground by bypass capacitance 64. The suppressor grid 56 is connected through coupling capacitance 60 to the anode 42 and also connected through grid resistance 61 to ground, the latter being shunted by unilaterally conducting device 62 poled to conduct current from the suppressor grid 56 to ground. The anode 57 is connected through anode load resistance 63 to the junction of resistances 58 and 59. The gating device 17 has the characteristic of developing an output at its anode 57 only when the voltages applied to grids 54 and 56 are of the same positive polarity with respect to the cathode 53. Accordingly, only the positive peaks of the differentiated pulses applied to the grid 54 from the amplifier 21 are effective in causing conduction in gating device 17. Thus, with signals of the form substantially as shown in graph B applied to the grid 54, at anode 57 is obtained signals having a form shown in graph F. The signal of graph F is applied to the delay line 18. Delay line 18 may comprise any of a variety of delay lines which include lumped circuit elements or distributed circuit elements arranged in the form of a transmission line and adapted to introduce the desired delay in the signal supplied thereto. The delay line has a pair of input terminals 65 and 66 and intermediate tap output terminal 67. The input terminal 65 is connected to the anode 57. The other input terminal 66 is connected to ground. The remote end of the delay line 18 is substantially short circuited by capacitance 18a. The delay in the signal between the output terminal 67 and input terminal 65 is arranged to correspond to the desired delay between the trailing edge of the horizontal synchronizing pulse and the start of the color burst. The delay from the output terminal 67 to the end of the line 18 and back to the output terminal 67 is arranged to correspond to the duration of the color burst. Thus, at the output terminal 67 is obtained a wave of the form shown in graph G of Fig. 4.

The output terminal 67 is connected through coupling capacitance 68 to the grid 69 of buffer amplifier 70 which also includes a cathode 71 and an anode 72. Cathode 71 is connected through cathode resistances 73 and 74 to ground. The grid 69 is also connected through grid leak resistance 75 to the junction of resistances 73 and 74. The anode 72 is connected through anode load resistance 76 and the decoupling resistance 77 to the terminal 32. The junction of resistances 76 and 77 is connected to ground through decoupling capacitance 78. Thus, between the anode 72 and ground is obtained a signal of the kind shown in the graph G of Fig. 4 except inverted in polarity. This signal is applied to the multivibrator 20.

Multivibrator 20 comprises electron discharge device 79 including a cathode 80, a grid 81, and an anode 82, and electron discharge device 83 including a cathode 84, a grid 85, and an anode 86. The cathodes 80 and 84 are connected through cathode load resistance 87 to ground. Grid 81 is connected through coupling capacitance 88 to anode 72. The grid 81 is connected through grid biasing resistance 89 to ground and also through voltage dropping resistances 90 and 91 to the positive terminal 32. The junction of resistances 90 and 91 is connected through decoupling capacitance 92 to ground. The anode 82 is connected through anode load resistance 93 to point 94, the junction of resistances 90 and 91. The anode is also connected through coupling capacitor 95 to grid 85. Grid 85 is connected through biasing resistance 96 to point 94. The anode 86 is connected through anode load resistance 97 to point 94.

In operation, the electron discharge device 83 is normally conductive in the absence of any signal applied to the multivibrator 20 by virtue of the fact that the grid 85 is connected through resistance 96 to a point of positive potential. The electron discharge device 79 is normally nonconductive since the grid 81 is connected to a point having a potential sufficiently negative with respect to cathode 80 at which a high positive bias is developed due to conduction of current from electron discharge device 83 through cathode resistance 87. Upon the application of a positive pulse to the grid 81 of device 79, the latter device becomes conductive thereby causing a drop in the potential of anode 82 and through capacitance 95 causing a drop in potential of the grid 85, thereby rendering the electron discharge device 83 nonconductive. The device normally remains nonconductive until the charge on capacitance 95 has decayed through resistances 96 and 93 to a value sufficient to again render the device 83 conductive. The time constant of the circuit comprising capacitance 95 and resistances 96 and 93 is arranged to be appreciably longer than the interval of separation of the pairs of pulses of graph G. Accordingly, prior to the time that device 83 normally becomes conductive again, a negative pulse is received in grid 81 thereby rendering electron discharge device 79 nonconductive and device 83 again conductive. Thus, at the anode 86 is developed a pulse of voltage having a duration coincident with the duration of the interval between the pairs of pulses of graph G. This pulse is shown in graph H and is applied to the burst gate generator 20a to develop at the output terminal thereof pulses of waves.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. Apparatus for detecting the presence of pulses of intermediate duration in a train of pulses including pulses of short, intermediate, and long durations comprising means for deriving a series of very short pulses each corresponding to the lagging edge of the pulses of said train, means for delaying the pulses of said train by a predetermined interval greater than the duration of said short pulses and less than the duration of said intermediate pulses, means for delaying each of the pulses of said train of pulses by another predetermined interval greater than the duration of each of said intermediate pulses and less than the duration of said pulses of long duration, means for inverting the phase of one of said delayed trains of pulses and combining said one delayed train of pulses with the other delayed train of pulses to obtain a resultant train of pulses, means for combining said resultant train of pulses with said train of very short pulses to derive another train of pulses each pulse of which occurs during the coincidence of said very short pulses with pulses of one polarity in said resultant train of pulses.

2. Apparatus for detecting the presence of pulses of intermediate duration in a train of pulses including pulses of short, intermediate, and long durations comprising means for deriving a series of very short pulses each corresponding to the lagging edge of the pulses of said train, means for delaying the pulses of said train by a predetermined interval greater than the duration of said short pulses and less than the duration of said intermediate pulses, means for delaying each of the pulses of said train of pulses by another predetermined interval greater than the duration of each of said intermediate pulses and less than the duration of said pulses of long duration, means for inverting the phase of one of said delayed trains of pulses and combining said one delayed train of pulses with the other delayed train of pulses to obtain a resultant train of pulses, means for combining said resultant train of pulses with said train of very short pulses to derive another train of pulses, each pulse of which occurs during the coincidence of said very short pulses with pulses of one polarity in said resultant train of pulses, means responsive to said latter train of pulses for deriving a train of keying pulses, means for developing a burst of oscillations during the occurrence of said keying pulses, 3. Apparatus for detecting the presence of pulses of intermediate duration in a train of pulses including pulses of short, intermediate, and long durations comprising means for deriving a series of very short pulses each corresponding to the lagging edge of the pulses of said train, means for delaying the pulses of said train by a predetermined interval greater than the duration of said short pulses and less than the duration of said intermediate pulses, means for delaying each of the pulses of said train of pulses by another predetermined interval greater than the duration of each of said intermediate pulses and less than the duration of said pulses of long duration, means for inverting the phase of one of said delayed trains of pulses and combining said one delayed train of pulses with the other delayed train of pulses to obtain a resultant train of pulses, means for combining said resultant train of pulses with said train of very short pulses to derive another train of pulses, each pulse of which occurs during the coincidence of said very short pulses with pulses of one polarity in said resultant train of pulses, means responsive to each of the pulses of said latter train of pulses for developing a pair of pulses, each of the pulses of said pair being separated by a third predetermined interval, means responsive to each of said pairs of pulses for developing a keying pulse having a duration of said third predetermined interval.

4. In combination, in a television system carrying a train of synchronizing signals including horizontal synchronizing pulses followed by equalizing pulses which in turn are followed by vertical synchronizing pulses, said horizontal synchronizing pulses being intermediate in duration to the duration of said equalizing and said vertical synchronizing pulses, comprising means for deriving a series of very short pulses each corresponding to the lagging edge of the pulses of said train, means for delaying the pulses of said train by a predetermined interval greater than the duration of said short pulses and less than the duration of said intermediate pulses, means for delaying each of the pulses of said train of pulses by another predetermined interval greater than the duration of each of said intermediate pulses and less than the duration of said pulses of long duration, means for inverting the phase of one of said delayed trains of pulses and combining said one delayed train of pulses with the other delayed train of pulses to obtain a resultant train of pulses, means for combining said resultant train of pulses with said train of very short pulses to derive another train of pulses each pulse of which occurs during the coincidence of said very short pulses with pulses of one polarity in said resultant train of pulses, means responsive to said latter train of pulses for deriving a train of keying pulses, means for developing a burst of oscillations during the occurrence of said keying pulses, and means for combining said burst of oscillations with said synchronizing signal.

5. In combination, in a television system carrying a train of synchronizing signals including horizontal synchronizing pulses followed by equalizing pulses which in turn are followed by vertical synchronizing pulses, said horizontal synchronizing pulses being intermediate in duration to the duration of said equalizing and said vertical synchronizing pulses, means for deriving a first train of short pulses each corresponding to the lagging edge of each of said pulses in said synchronizing signal, means for deriving from said one train of pulses a second train of pulses substantially identical thereto except that each pulse in said derived train is delayed in occurrence with respect to the corresponding pulse in said one train by a predetermined interval greater than the duration of each of said short pulses and less than the duration of each of said intermediate pulses, means for deriving from said one train of pulses a third train of pulses substantially identical thereto except that each pulse of said derived train is delayed in occurrence with respect to the corresponding pulse in said one train by another predetermined interval greater than the duration of each of said intermediate pulses and less than the duration of said long pulses, means for inverting the phase of one of said delayed trains of derived pulses with respect to the other thereof, means for adding said inverted trains of pulses and the other of said delayed train of pulses to obtain a resultant train of pulses, means for deriving a still other train of pulses having an occurrence during the coincidence of said differentiated pulses with pulses of one polarity of said resultant train of pulses, thereby detecting said horizontal synchronizing pulses.

References Cited in the file of this patent

UNITED STATES PATENTS

| | | |
|---|---|---|
| 2,653,187 | Luck | Sept. 22, 1953 |
| 2,681,379 | Schroeder | June 15, 1954 |
| 2,728,812 | Bedford | Dec. 27, 1955 |

UNITED STATES PATENT OFFICE

CERTIFICATE OF CORRECTION

Patent No. 2,874,217 February 17, 1959

Max H. Diehl

It is hereby certified that error appears in the printed specification of the above numbered patent requiring correction and that the said Letters Patent should read as corrected below.

Column 2, line 66, for "at point A of which" read -- at point C of which --; line 68, for "graph C and which" read -- graph A and which --.

Signed and sealed this 18th day of August 1959.

(SEAL)

Attest:

KARL H. AXLINE
Attesting Officer

ROBERT C. WATSON
Commissioner of Patents